United States Patent [19]
Bornhorst, Jr. et al.

[11] Patent Number: 5,923,435
[45] Date of Patent: *Jul. 13, 1999

[54] ENGRAVER AND ENGRAVING METHOD FOR DETECTING AND MEASURING RUN-OUT ASSOCIATED WITH A CYLINDER

[75] Inventors: Kenneth Frank Bornhorst, Jr., Centerville; Robert Dean Likins, Wilmington; Danny D. Myers, Dayton; David R. Seitz, Vandalia; Curtis Woods, Centerville, all of Ohio

[73] Assignee: Ohio Electronic Engravers, Inc., Dayton, Ohio

[*] Notice: This patent is subject to a terminal disclaimer.

[21] Appl. No.: 08/883,048

[22] Filed: Jun. 26, 1997

Related U.S. Application Data

[63] Continuation of application No. 08/541,330, Oct. 9, 1995, Pat. No. 5,652,659.

[51] Int. Cl.⁶ .................................................. B41C 1/02
[52] U.S. Cl. .......................................................... 358/299
[58] Field of Search ............................................. 358/299

[56] References Cited

U.S. PATENT DOCUMENTS

| | | | |
|---|---|---|---|
| 3,843,875 | 10/1974 | Goodstal et al. | 235/151.11 |
| 4,450,486 | 5/1984 | Buechler | 358/299 |
| 4,678,976 | 7/1987 | Inoue | 318/577 |
| 4,830,552 | 5/1989 | Ryf | 409/103 |
| 5,329,215 | 7/1994 | Fraser et al. | 318/603 |
| 5,424,845 | 6/1995 | Holowko et al. | 358/299 |
| 5,424,846 | 6/1995 | Bornhorst, Jr. | 358/299 |
| 5,438,422 | 8/1995 | Holowko et al. | 358/299 |
| 5,454,306 | 10/1995 | Fraser et al. | 101/28 |
| 5,661,565 | 8/1997 | Bronhorst, Jr. | 358/299 |
| 5,719,683 | 2/1998 | Yoshida | 358/299 |

OTHER PUBLICATIONS

"Productivity Solutions. CNC Turning Centers", Emco Maier Corporation, Columbus, Ohio, undated publication.
"Horizontal Machining Centers", Haas Automation, Inc., Chatsworth, California, 1996.
"Vertical Machining Centers", Haas Automation, Inc., Chatsworth, California, undated publication.
Flexible Maching Module, Makino, Mason, Ohio, Sep. 1996.
"Machine Tool Specification Guide", Cincinnati Milacron, Inc., Cincinnati, Ohio, undated publication.
"Avenger, CNC Turning Centers", Cincinnati Milacron, Inc., Cincinnati, Ohio, undated publication.
"Polishmaster: 30% Higher performance with new Cassette Tools," MDC Max Datwyler AG, CH 33 68 Bleienbach/ Schweiz Switzerland, 3 pgs. (undated brochure).

(List continued on next page.)

Primary Examiner—Peter S. Wong
Assistant Examiner—Gregory J. Toatley, Jr.
Attorney, Agent, or Firm—Jacox, Meckstroth & Jenkins

[57] ABSTRACT

A method and apparatus for automatically measuring a cylinder characteristic, such as a cylinder diameter or a cylinder run-out and then automatically adjusting the engraver in response to the measurement and subsequently engraving the cylinder to account for such characteristic. The engraver includes a run-out detector for detecting a cylinder characteristic of the cylinder on the engraver and the run-out detector includes an LVDT sensor and a run-out circuit for generating a signal generally corresponding to a shape of the cylinder surface. The run-out circuit is capable of generating a measured run-out using the signal generated by the LVDT sensor. The method and apparatus also provides a method and apparatus for automatically adjusting for the cylinder characteristic using manual, mechanical and/or electronic features of the method and apparatus.

28 Claims, 13 Drawing Sheets

OTHER PUBLICATIONS

"Super Polishmaster," MDC Max Datwyler AG, CH 33 68 Bleienbach/Schweiz Switzerland, 2 pgs. (undated brochure).

"Polishmaster Junior," MDC Max Datwyler AG, CH 33 68 Bleienbach/Schweiz Switzerland, 2 pgs. (undated brochure).

"Polishmaster Junior–II," MDC Max Datwyler AG, CH 33 68 Bleienbach/Schweiz Switzerland, 2 pgs. (undated brochure).

"Finishmaster," MDC Max Datwyler AG, CH 33 68 Bleienbach/Schweiz, Switzerland, 3 pgs. (undated brochure).

"Valcus Electronic Engraving System," MDC Max Datwyler AG, CH 33 68 Bleienbach/ Schweiz Switzerland, 2 pgs. (undated brochure).

"Kasper Walter: Diamet," Maschinenfabrik Kaspar Walter GmbH & Co. KG, Plinganserstrasse 22, 8000 Munchen 70, 4 pgs. (undated brochure).

Albion Information Packet, Albion Devices, Inc., 512 Via de la Valle, Suite 300, Solana Beach, CA 92075, 11 pgs., 1990.

Tegatron Information Packet, Tegatron Inc., 47 East Fourth Street, Franklin, Ohio 45005, 8 pgs., 1991.

"Systems for Data Acquisition and Control", by Daytronic Corporation, 5 pgs., 1989.

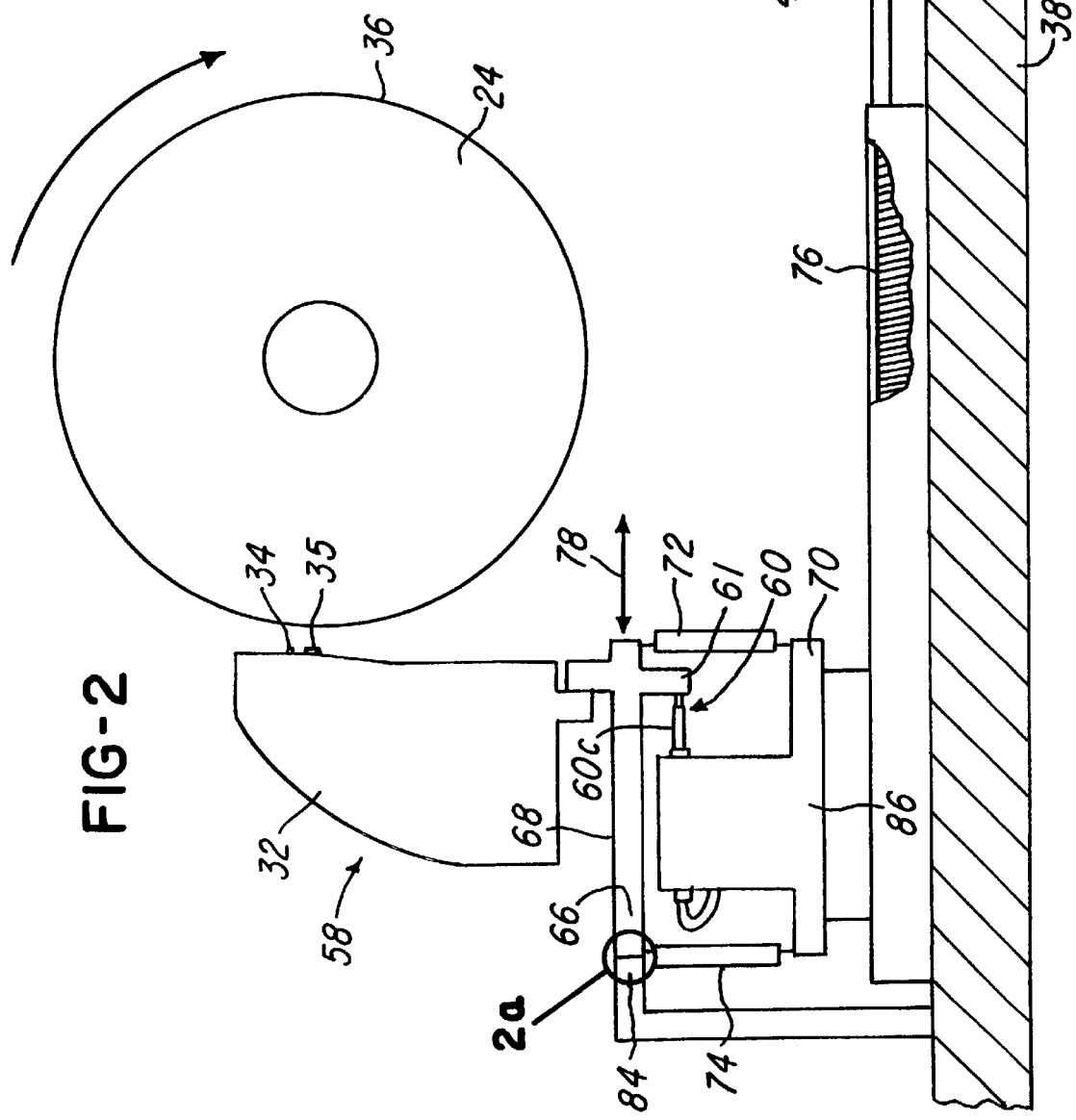
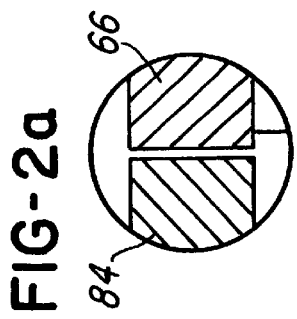

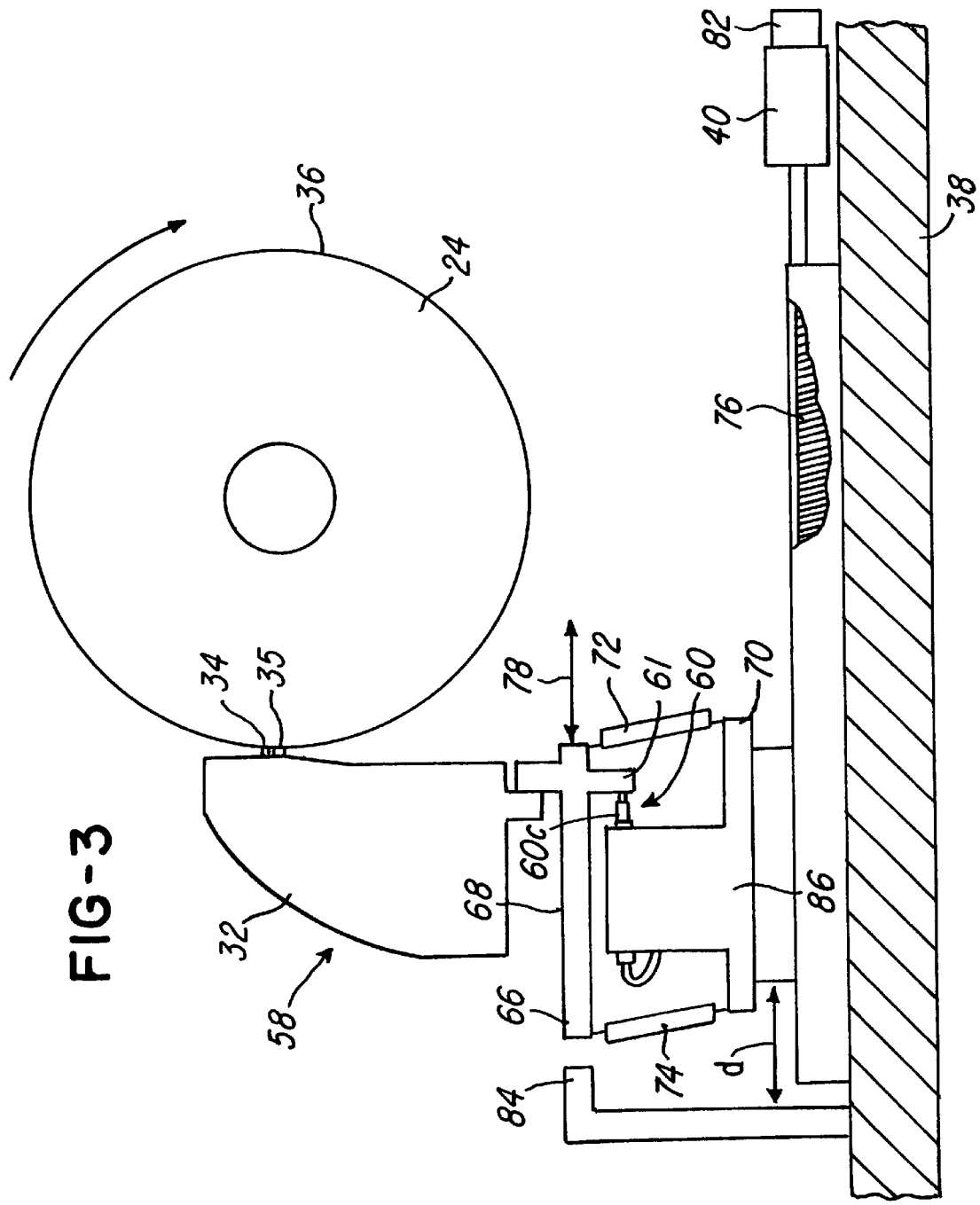

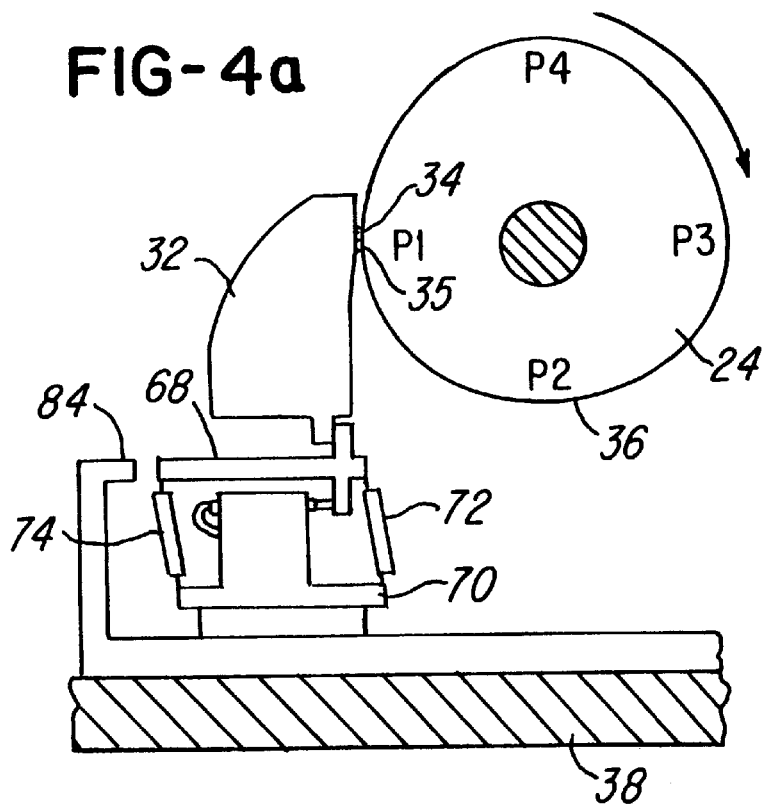
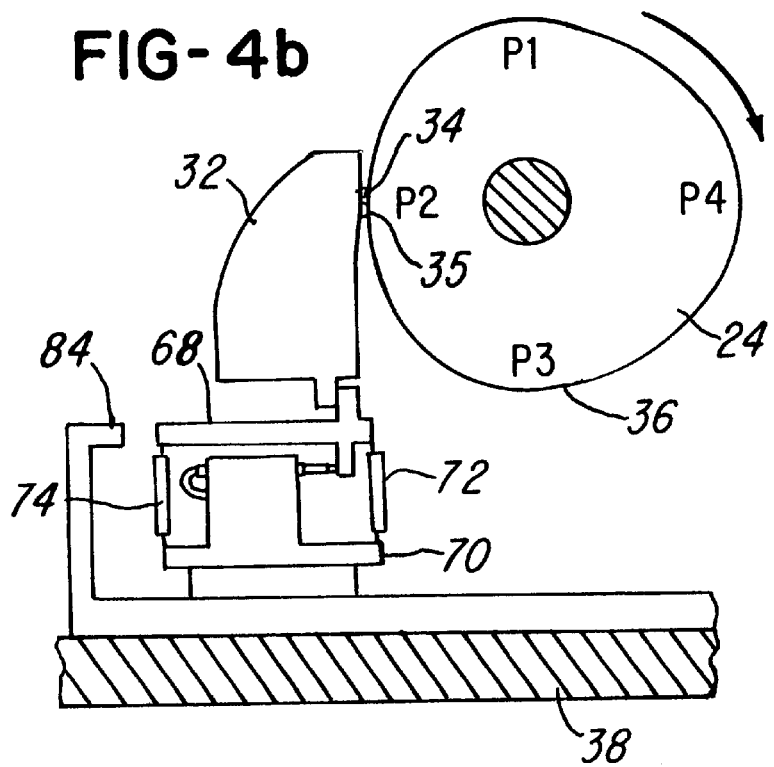

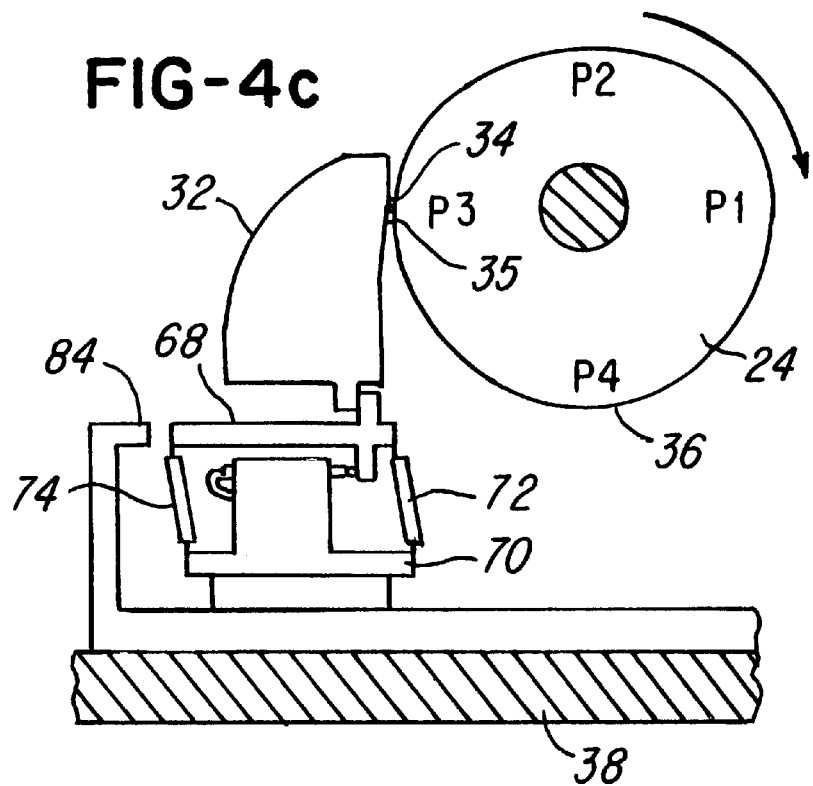
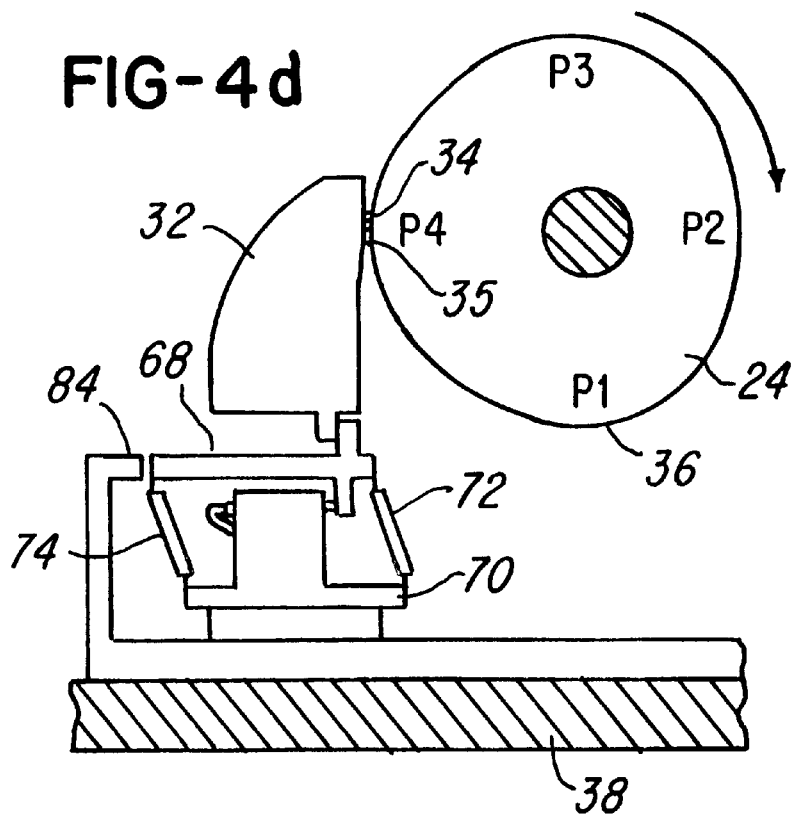

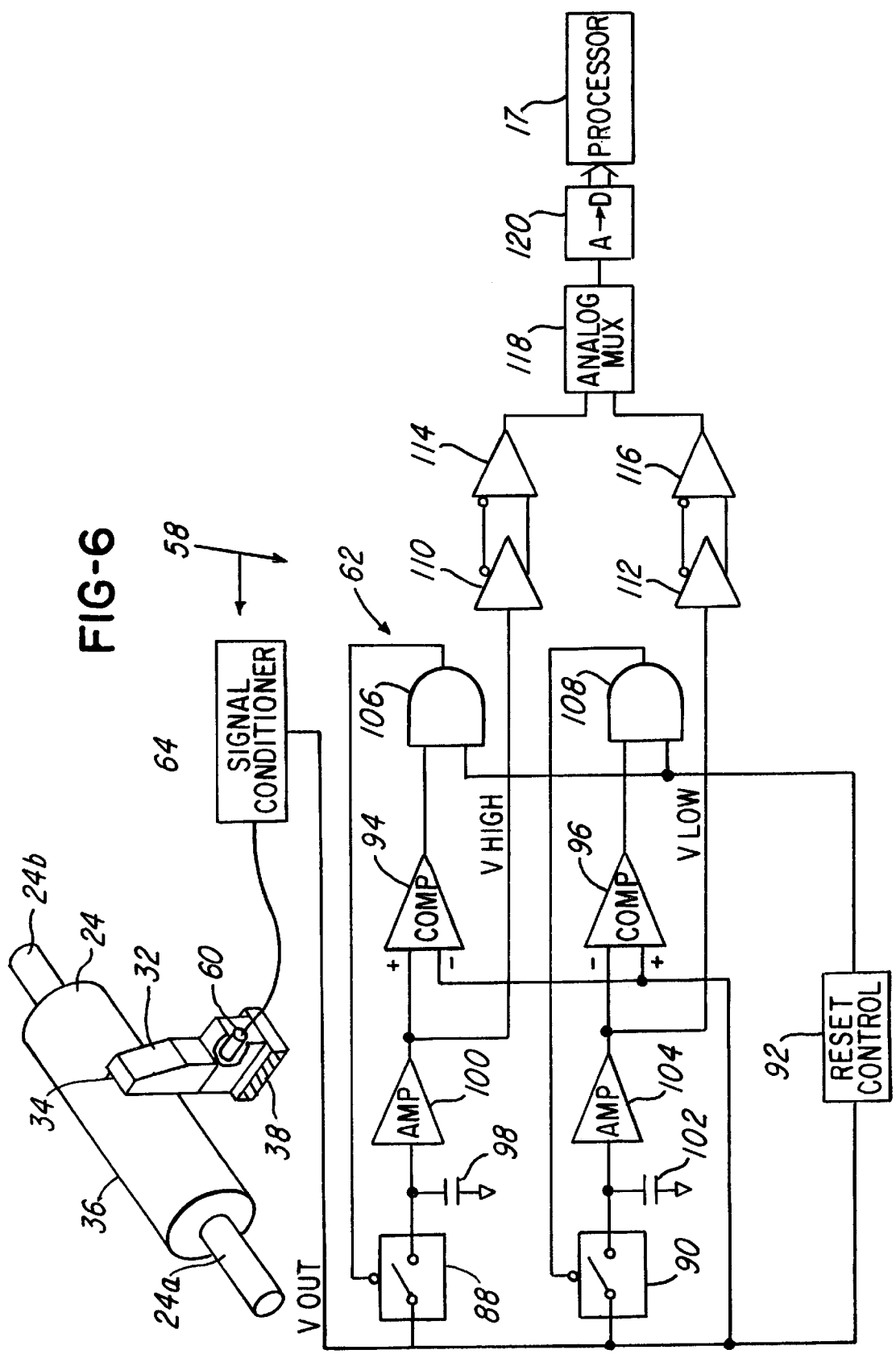

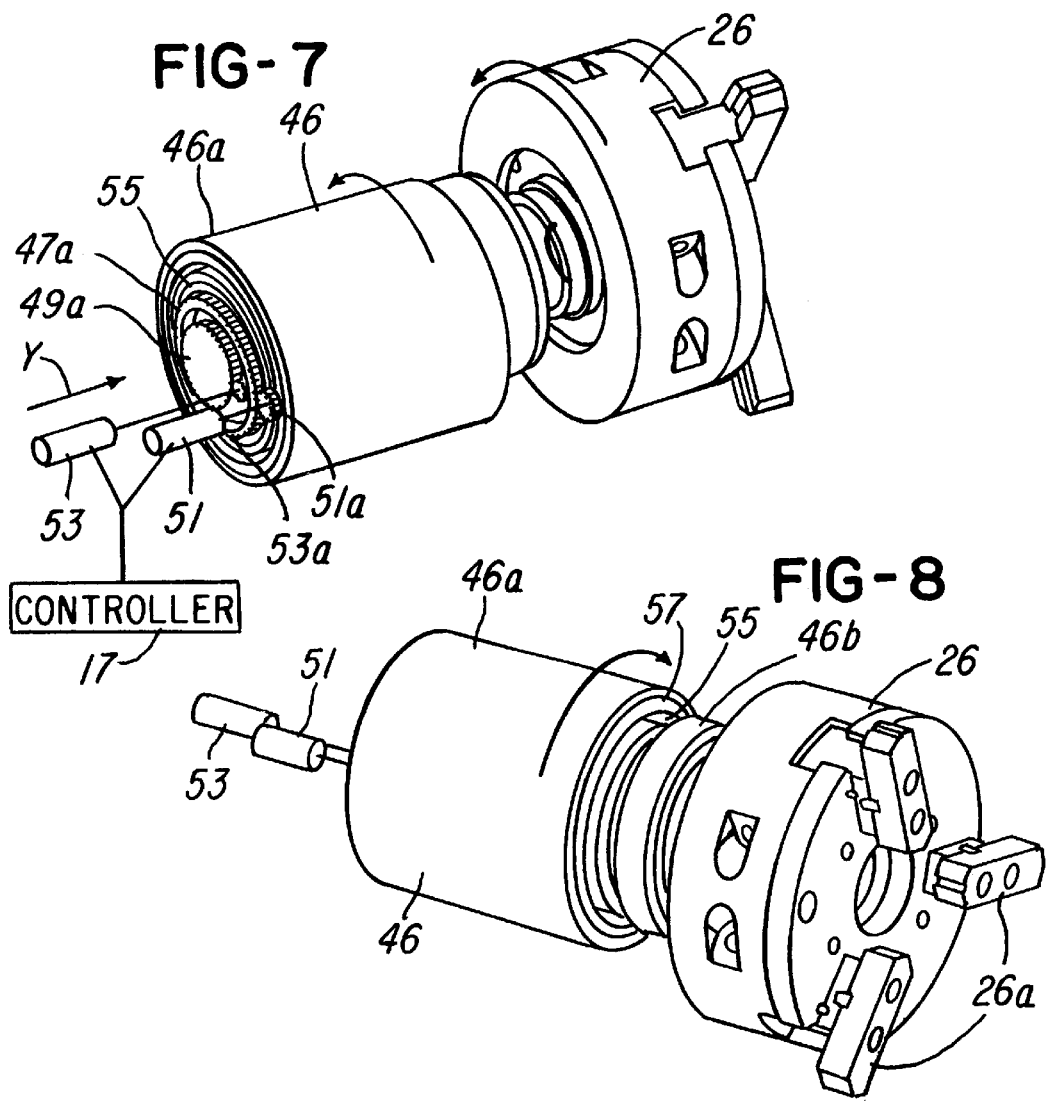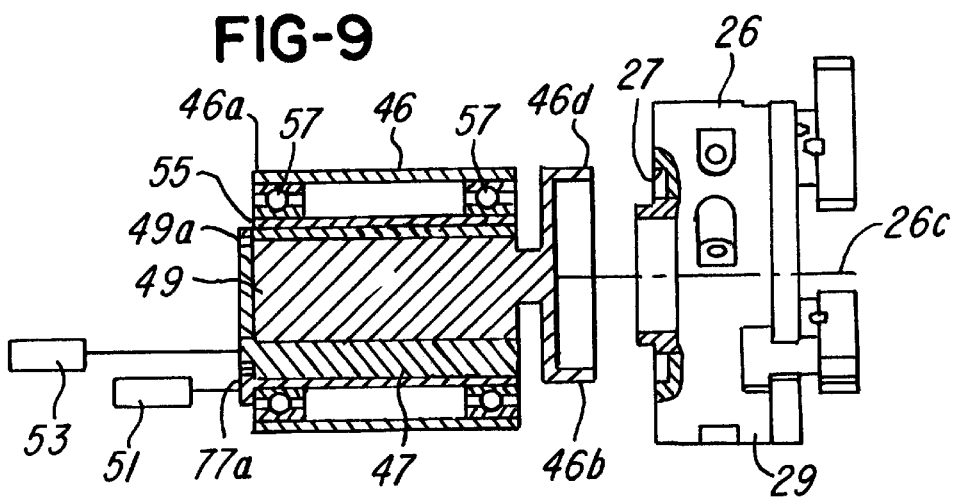

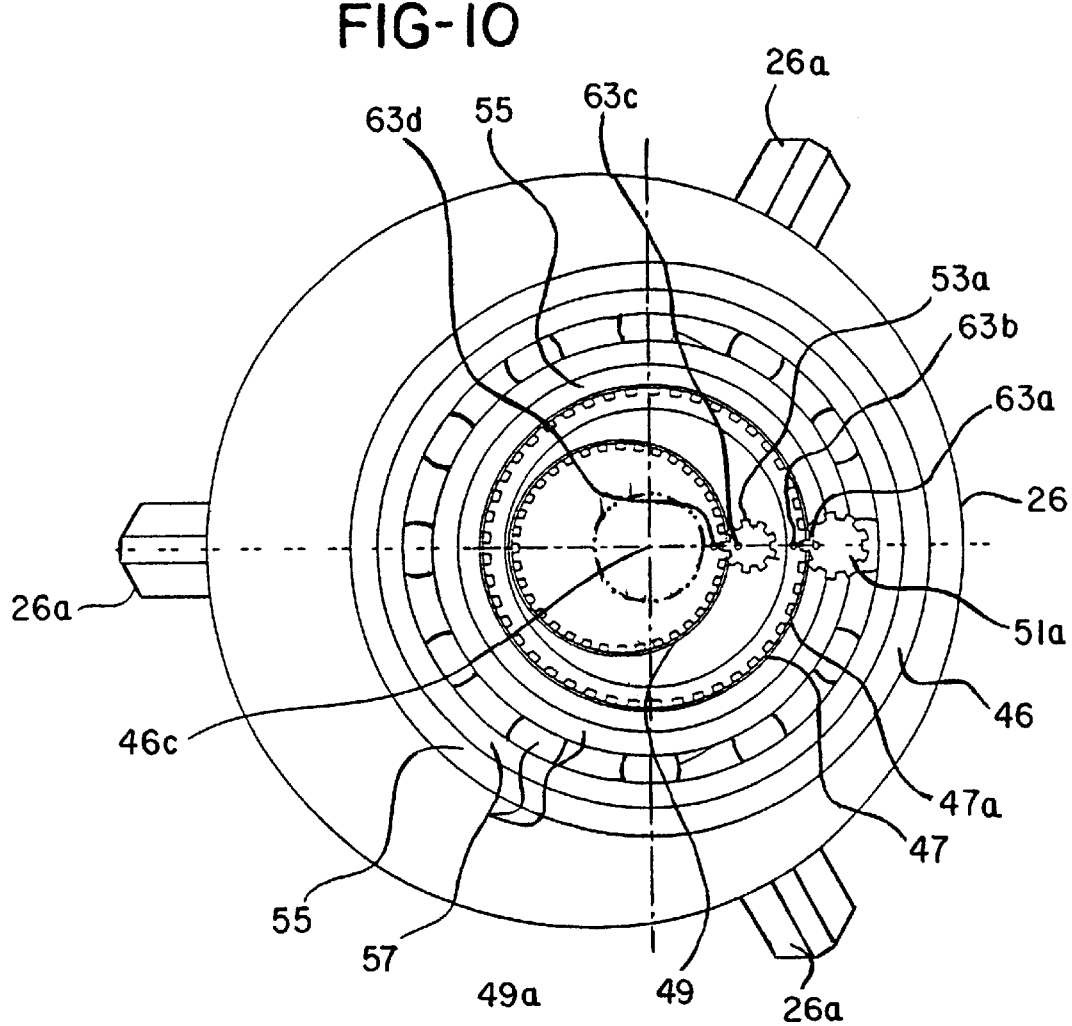

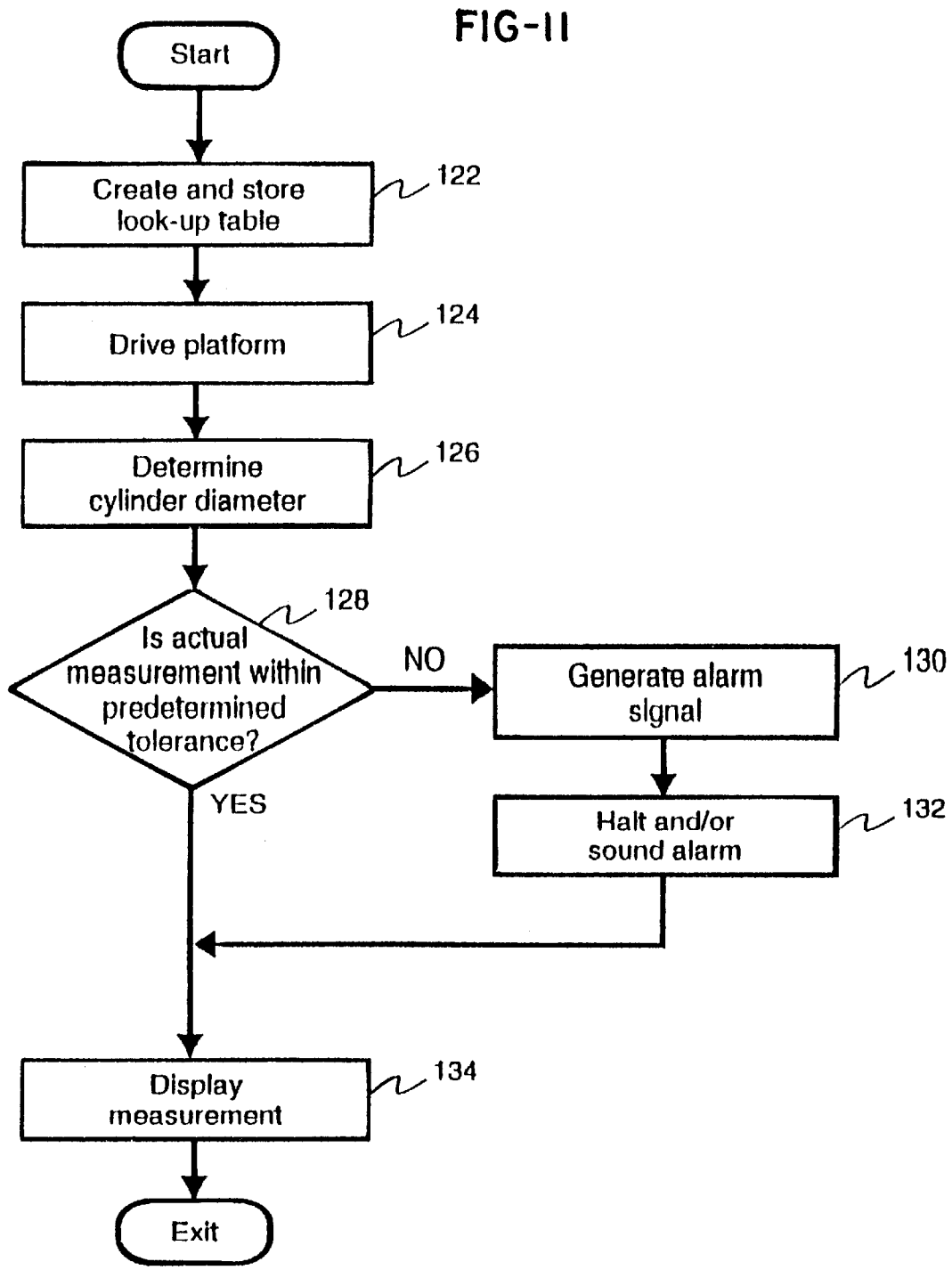

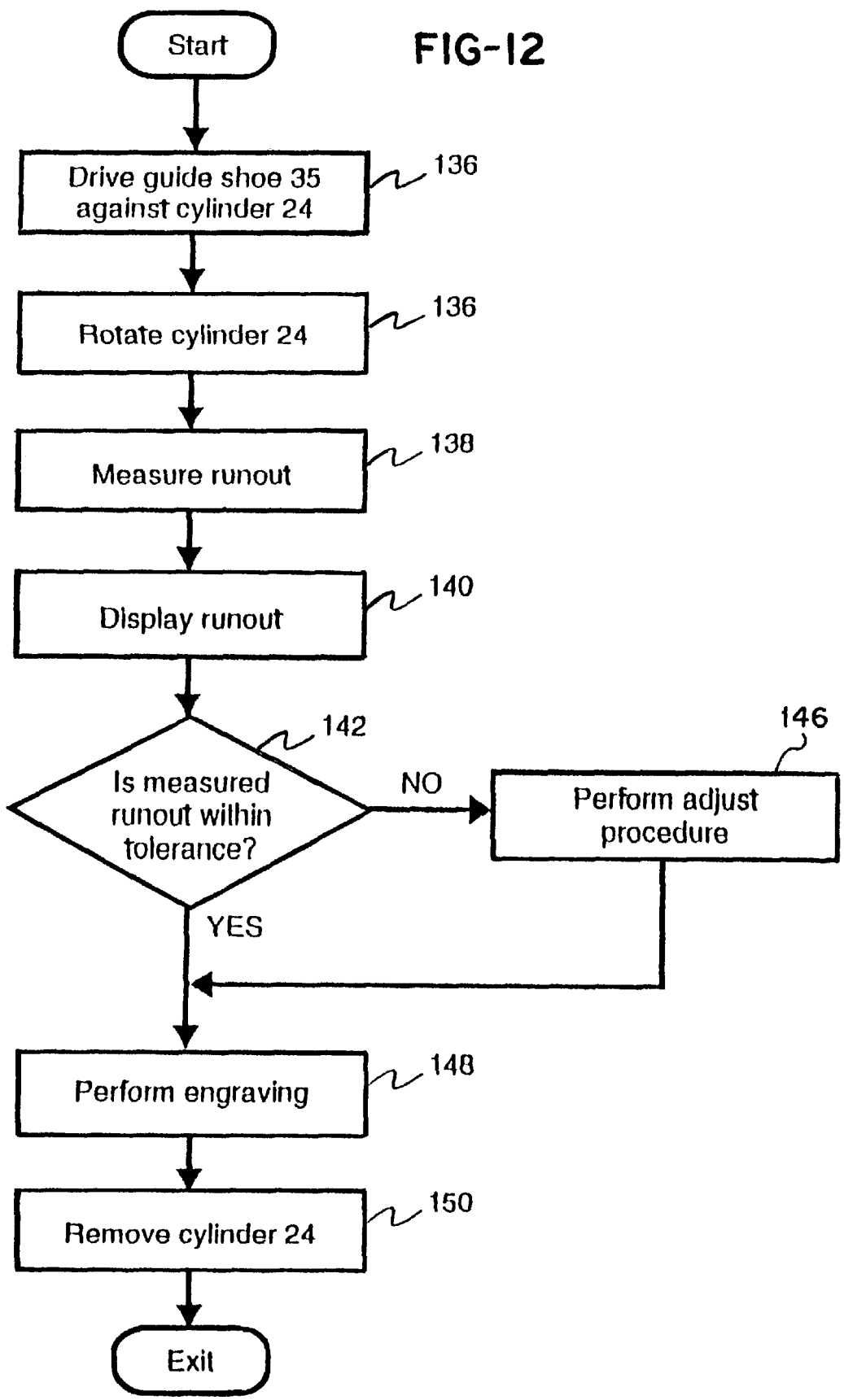

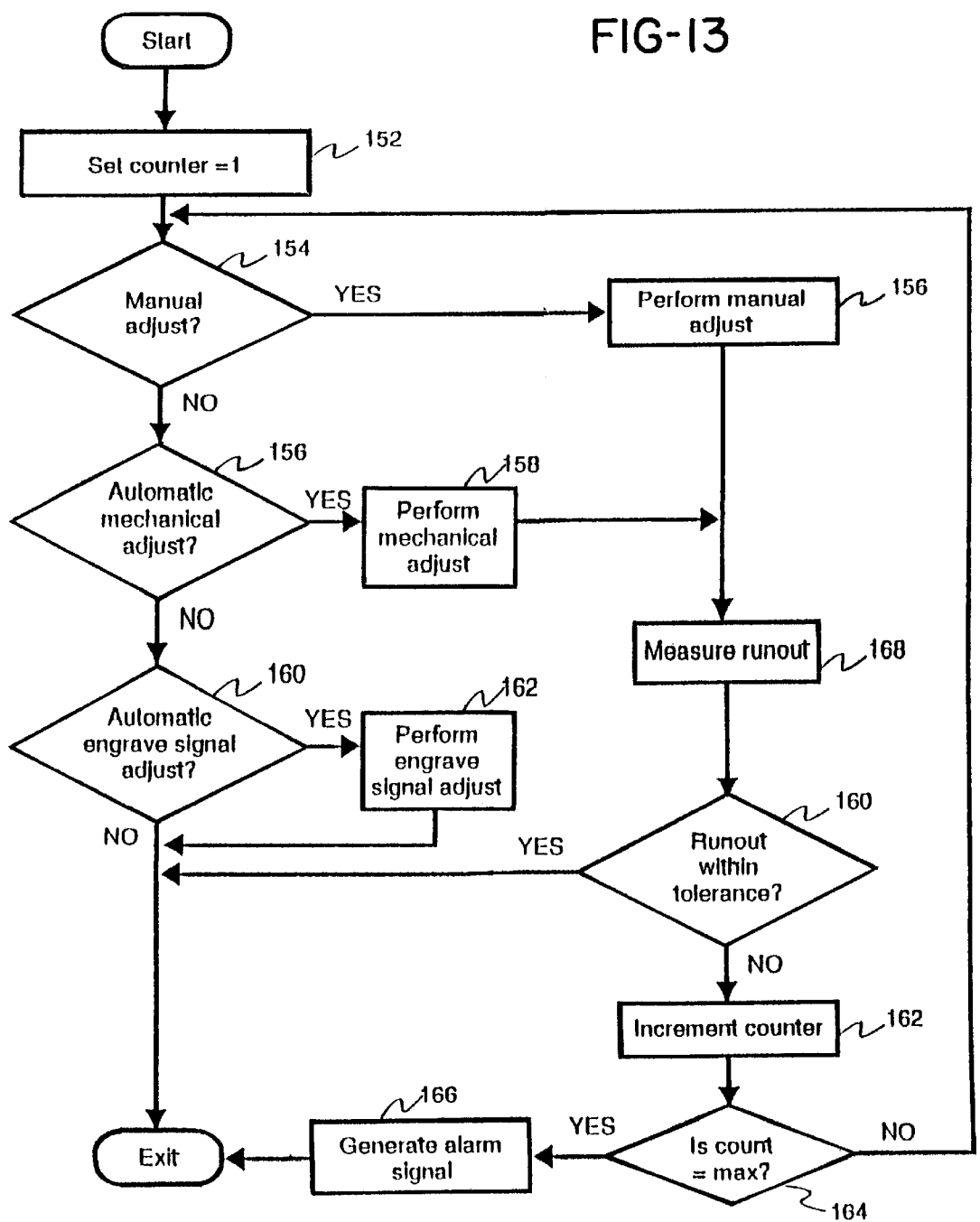

ENGRAVER AND ENGRAVING METHOD FOR DETECTING AND MEASURING RUN-OUT ASSOCIATED WITH A CYLINDER

CROSS REFERENCE TO RELATED APPLICATION

This application is a continuation of application Ser. No. 08/541,330 filed Oct. 9, 1995 U.S. Pat. No. 5,652,659.

BACKGROUND OF THE INVENTION

1. Field of the Invention

This invention relates to engraving devices and more particularly, to a method and apparatus for determining a cylinder characteristic, such as cylinder diameter and a cylinder run-out, and adjusting an engraver in response thereto.

2. Description of Related Art

Prior art devices of the type shown in U.S. Pat. Nos. 4,450,486; 5,424,846; 5,438,422; 5,424,845; 5,329,215 typically comprised an engraving head having an engraving device, such as a diamond stylus, and a guide shoe. The guide shoe bore against a surface of a cylinder and provided a reference for the engraving process. An electromagnetic driver mounted within the engraving head caused the engraving device to oscillate into engraving contact with the cylinder as the cylinder rotated about its cylindrical axis, thereby causing either a helical or cylindrical tract of engraved areas or cells to be engraved on the surface of the cylinder.

The cylinders engraved were oftentimes not concentric about their axis or if they comprised support shafts, it was not uncommon that the axis of the support shafts was not coaxial with the rotational axis of the cylinder, thereby causing the cylinder to not rotate about its rotational axis.

Still another problem with engravers of the past related to registration. The cylinder typically had two end support shafts which were received in chucks located on the engraver. Sometimes one or more of the support shafts were not properly registered or aligned in the chuck in which they were mounted.

These problems were sometimes called "run out". In engraving devices of the past, run-out caused the engraving device or stylus to engrave areas which were not of the proper density. For example, if the cylinder comprised an eccentric, then on the high areas, the engraving device would engrave areas having larger densities, whereas on "low" areas, the engraving device would engrave areas having lower densities due to the proximity of the engraving device relative to the surface of the cylinder. In the past, an operator would attempt to adjust the engraver to eliminate the mis-registration by manually determining the "run out" associated with a cylinder and then manually adjusting one or more jaws on a chuck to account for that run out. Typically, an operator would place a gauge in contact with the surface of the engraver and attempt to measure the run out associated with that cylinder. Thereafter, the operator may attempt to adjust the engraver to eliminate the run-out by manually loosening and retightening one more jaws on one or both chucks which supported an end shaft of the cylinder in order to attempt to eliminate the run out.

These processes were oftentimes inaccurate and time consuming and required manual intervention.

What is need, therefore, is a method and apparatus for automatically measuring the run-out associated with a cylinder and then automatically adjusting the engraver to reducer or eliminate such run-out.

SUMMARY OF THE INVENTION

It is therefore a primary object of this invention to provide a method and apparatus for engraving a cylinder by automatically measuring a characteristic of the cylinder and adjusting the engraver in response to the measurement.

Another object of this invention is to provide a method and apparatus for providing an accurate measurement or determination of a cylinder's diameter.

In one aspect, this invention comprises a method for engraving a cylinder on an engraver comprising the steps of rotatably mounting a cylinder on the engraver and electronically measuring a characteristic of the cylinder, adjusting the engraver in response to the measurement and engraving the cylinder.

In another aspect this invention comprises a method for calibrating an engraver when a cylinder run-out is greater than a predetermined run-out, the method comprising the steps of electronically detecting the cylinder run-out and calibrating the engraver in response to the cylinder run-out.

In still another aspect of the invention, this invention comprises an engraving method comprising the steps of rotatably mounting a cylinder on an engraver, rotating the cylinder, electronically generating a cylinder run-out measurement associated with the cylinder, and calibrating the engraver to account for the cylinder run-out measurement if the cylinder run-out measurement exceeds a predetermined run-out, and engraving a predetermined pattern on the cylinder.

In yet another aspect of the invention, this invention comprises a run-out detector for detecting a cylinder characteristic comprising a sensor for sensing a cylinder characteristic of the cylinder and for generating a cylinder signal corresponding thereto, and a processor coupled to the sensor for receiving the cylinder signal and for determining the cylinder characteristic in response thereto.

Another object of this invention is to provide a method for automatically measuring a characteristic, such as run-out, cylinder diameter, cylinder concentricity and/or asymmetry.

Another object of this invention is to provide means for determining a topography of a cylinder, thereby facilitating determining localized high or low spots at various places or regions on a surface of the cylinder.

Still another object of this invention is to provide an engraver which can determine a run-out associated with a cylinder and adjust to account for the run-out by processing at least one engraving signal associated with a pattern to be engraved or energizing a chuck drive to automatically adjust a position of the cylinder.

Yet another object of the invention is to provide an engraver having a chuck driver which can be energized to automatically adjust a position of at least one chuck in order to adjust a position of the cylinder in response to a measured run-out.

Another object of this invention is to provide a closed-loop method and apparatus for adjusting an engraver to account for cylinders that comprise a run-out due to non-eccentricity or mis-registration in real-time.

These objects and others may be more readily understood in connection with the following specification, claims, and drawings.

BRIEF DESCRIPTION OF THE DRAWINGS

FIG. 2 is a fragmentary view showing various features including a run-out detection system for detecting a cylinder characteristic, such as a cylinder diameter or cylinder run-out;

FIG. 2A is an exploded view showing a platform and home references position;

FIG. 3 is a view similar to FIG. 2 showing the engraving head biased against the cylinder with column supports being flexed towards a reference point;

FIGS. 4A–4D illustrate an engraving head following a surface of a cylinder which is not cylindrical, showing lateral supports flexing to various positions depending on the lobe associated with the cylinder;

FIG. 6 shows further details of a run-out detector and associated run-out circuit;

FIG. 7 is a perspective view showing features of a chuck adjuster and associated chuck;

FIG. 8 is another perspective view similar to the view shown in FIG. 7 showing various features of the chuck adjuster and chuck;

FIG. 9 is a sectional view showing other features of a plurality of eccentrics situated in a bearing, as well as a collet, which facilitates coupling the chuck to the chuck adjuster;

FIG. 10 is a view taken in the direction of arrow Y in FIG. 7 showing further details of the dual eccentric features which facilitate mechanically adjusting an axial position of the chuck;

FIG. 11 is a schematic of a method for automatically determining a diameter of a cylinder;

FIG. 12 is another schematic illustrating a method for measuring run-out, adjusting to account for run-out and engraving;

FIG. 13 is another schematic illustrating an adjustment routine in accordance with one embodiment of the invention.

DESCRIPTION OF PREFERRED EMBODIMENT

Figure 1:
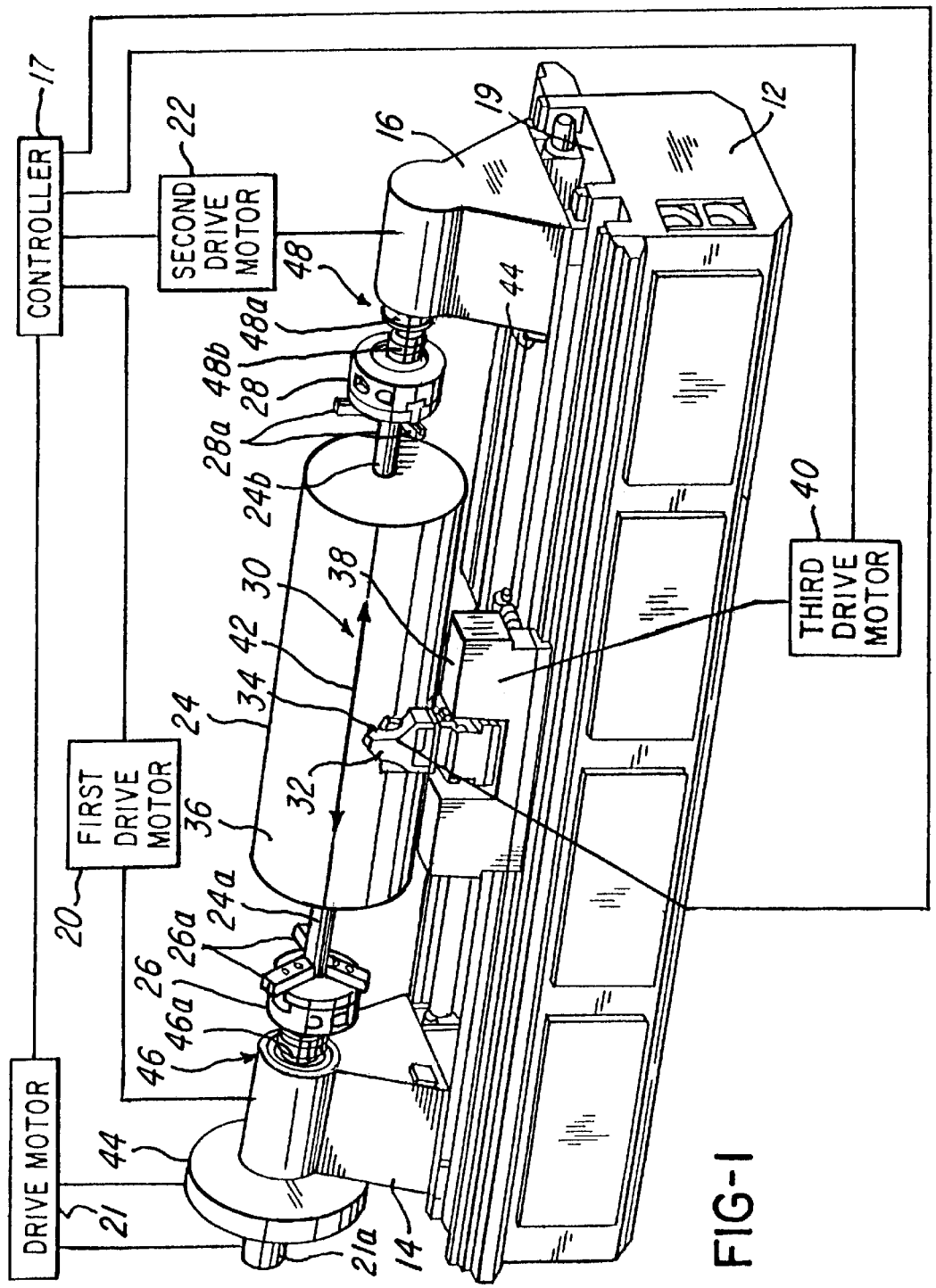
FIG. 1 is a general perspective view of an engraver incorporating features of this invention.
Figure 5:
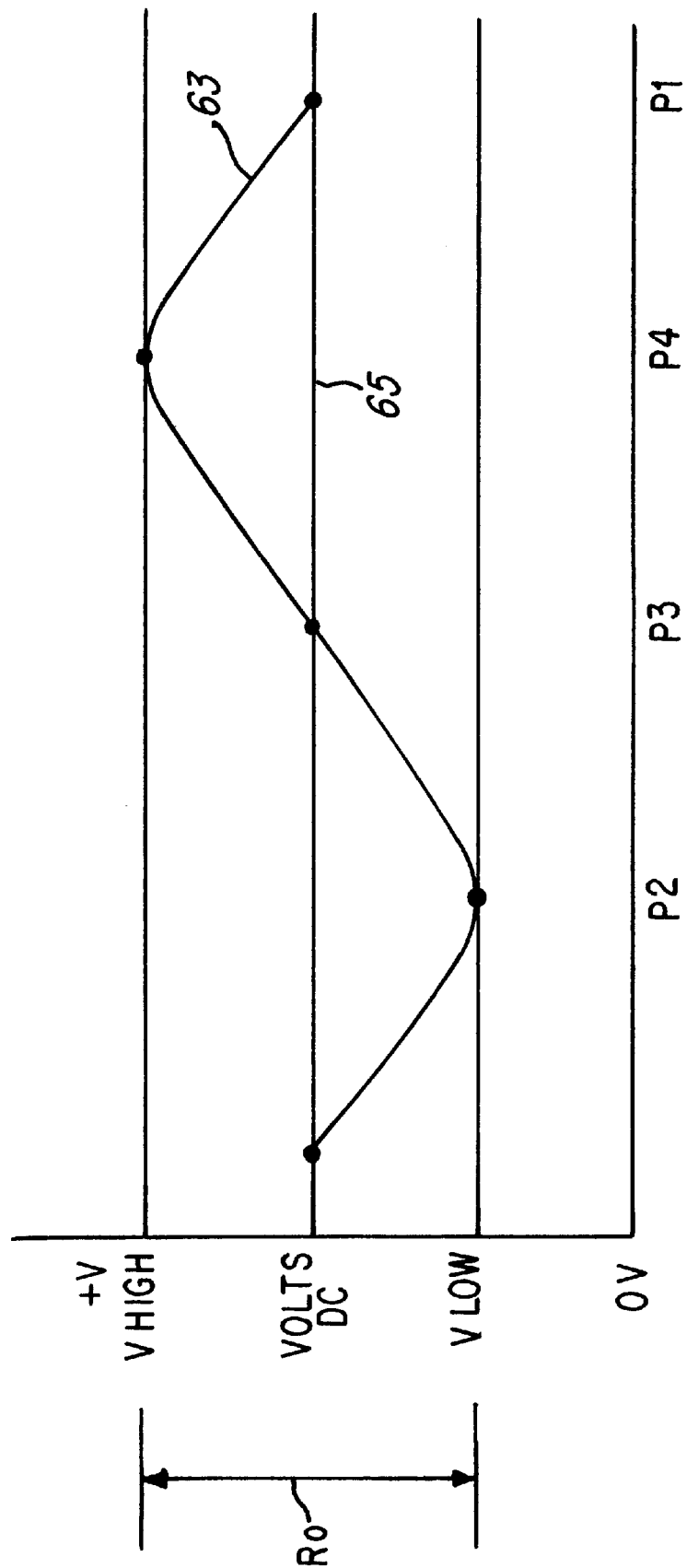
FIG. 5 illustrates a waveform representing a signal generated by a waveform illustrating a signal corresponding to the various positions illustrated in FIGS. 4A–4D.

FIG. 1 is a general perspective view of a preferred embodiment of an engraver, designated generally as engraver 10. In the embodiment being described, the engraver 10 is a gravure engraver, but the invention may be suitable for use in other engravers, such as a laser engraver. The engraver 10 may have a surrounding, slidable safety cabinet structure which is not shown for ease of illustration. Engraver 10 comprises a base 12 having a headstock 14 and a tailstock 16 slidably mounted in a track 19 such that the headstock 14 and tailstock 16 can move towards and away from each other. In this regard, engraver 10 comprises a plurality of linear actuators or first drive motor means or first drive motor 20 and a second drive motor means or second drive motor 22 which are capable of driving the headstock 14 and tailstock 16, respectively, towards and away from each other. For example, the drive motors may cause the headstock 14 and tailstock 16 to be actuated to a fully retracted position (not shown) or to a cylinder support position shown in FIG. 1.

The drive motors 20 and 22 may be selectively energized by a controller or processor 17 to cause headstock 14 and tailstock 16 to be actuated either independently or simultaneously. Although not shown, a single drive motor may be used with a single leadscrew (not shown) having reverse threads on which either end causes the headstock 14 and tailstock 16 to move simultaneously towards and away from each other as the leadscrew is driven. Driving both headstock 14 and tailstock 16 permits cylinders 24 of varying lengths to be loaded by an overhead crane, for example, whose path is perpendicular to the axis of rotation of, for example, a cylinder 24. Although not shown, it should be appreciated that a stationary headstock 14 or tailstock 16 may be used with a driven tailstock 16 or headstock 14, respectively.

The headstock 14 and tailstock 16 comprise a first support means or chuck 26 and a second support means or chuck 28, respectively. The chucks 26 and 28 each comprise a plurality of jaws 26a and 28a, respectively, which are suitable for gripping and rotatably supporting a first end shaft 24a and a second end shaft 24b, respectively, of cylinder 24, at an engraving station 30 of engraver 10. In the embodiment being described, the chucks 26 and 28 may be of conventional design or of the type shown and described in U.S. patent application Ser. No. 08/394,720, which is assigned to the same assignee as the present invention and which is incorporated herein by reference and made a part hereof.

The engraver 10 comprises an engraving head 32 having an engraving device, such as a cutting tool or stylus 34, for engraving a surface 36 of cylinder 24. In the embodiment being described, the engraving device 34 preferably has a diamond stylus; however, it should be appreciated that the invention may be used with other types of engraving devices, including, for example, laser engraving devices.

As shown in FIG. 2, engraving head 32 comprises a guide shoe 35 which is ideally positioned so that it contacts cylinder surface 36 during engraving. During engraving, the guide shoe 35 typically follows surface 36 and provides a reference for stylus 34.

The engraving head 32 is slidably mounted on a carriage 38 such that a third drive means or third drive motor 40 can drive the engraving head 32 towards and away from the surface 36 of cylinder 24 in a direction which is generally radial with respect to a rotational axis of the cylinder 24. The carriage 38 is also slidably mounted on base 12 such that it traverses the entire surface 36 of cylinder 24 in the direction of double arrow 42 in FIG. 1, which is generally parallel to the axis of cylinder 24. The engraver 10 also comprises at least one leadscrew (not shown) and drive motors (not shown) for driving the carriage 38 to move in the direction of double arrow 42. The engraving head 32, headstock 14, tailstock 16, carriage 38 and movement thereof is similar to that shown in U.S. Pat. Nos. 5,438,422; 5,424,845 and 5,329,215, which are assigned to the same assignee as the present invention and which are incorporated herein by reference and made a part hereof.

The engraver 10 also comprises a first chuck adjuster 46 and a second chuck adjuster 48 which are associated with the first and second chucks 26 and 28, respectively. The first chuck adjuster 46 has a driven end 46a coupled to a flywheel 44 and a collet end 46b (FIG. 9) which receives a collet 26b from the first chuck 26. The second chuck adjuster 48 has an end 48a rotatably mounted in tailstock 16 and a collet end 48b which receives a collet (not shown) of second chuck 28.

In the embodiment being described, the first and second chucks 26 and 28 receive end shafts 24a and 24b from cylinder 24 so that cylinder 24 becomes rotatably mounted in a desired axial position between headstock 14 and tailstock 16.

It should be appreciated that the first and second chuck adjusters 46 and 48 are capable of adjusting or altering a position of one or both end shafts 24a and 24b relative to the engraving head 32 in response to an adjustment signal received from processor 17. This, in turn, facilitates automatically adjusting or changing the rotational position of the surface 36 and the axis of rotation of cylinder 24 relative to the stylus 34. Advantageously, this facilitates reducing or eliminating cylinder misalignment or registration as well as the effects of run-out as described later herein. The construction and operation of the chucks 26 and 28 and their associated jaws 26a and 28a may be of conventional design or may even include features described in U.S. Pat. No. 5,661,565 which is assigned to the same assignee as the present invention and which is incorporated herein by reference and made a part hereof.

Referring now to FIGS. 7–10, the chuck adjuster 46 and associated chuck 26 will now be described. It should be appreciated that chuck adjuster 48 and its associated chuck 28 operate in substantially the same manner as chuck adjuster 46 and chuck 26, respectively. As best illustrated in FIG. 10, the chuck adjuster 46 comprises an outer eccentric sleeve 47 which comprises an associated gear 47a. An inner eccentric sleeve 49 having an associated gear 49a is rotatably mounted with suitable bearings (not shown) in outer eccentric sleeve 47. The gears 47a and 49a are spur gears which are driven by a plurality of selectively energizable chuck adjusters stepper motors 51 and 53 (FIGS. 7–9), respectively. The motors 51 and 53 comprise drive gears 51a and 53a for driving gears 47a and 49a, respectively. It should be noted that the motors 51 and 53 can drive gears 47a and 49a to the right or left (as viewed in FIG. 10) as may be necessary to achieve a desired adjustment of an axis 26c (FIG. 9) of chuck 26.

The motors 51 and 53 comprise encoders (not shown) which cooperate with timing marks 63a, 63b, 63c and 63d (FIG. 10) to determine a relative position of a chuck center line 26c (FIG. 9) relative to a chuck adjuster centerline 46c.

As shown in FIG. 10, the chuck adjuster 46 also comprises a containment sleeve 55 which is rotatably mounted within bearings (not shown) in headstock 14 (FIG. 1). It should be appreciated that containment sleeve 55 is conventionally coupled to and driven by fly wheel 44.

As best illustrated in FIG. 9, chuck adjuster 46 comprises the collet receiver 46b which is secured to the inner eccentric sleeve 47. The collet 46b may have an outside taper 46d which locks with an inner taper 27 to secure the adjuster 46 to a body 29 of first chuck 26 using suitable bolts (not shown) to provide a conventional taper lock mounting. It should be appreciated that while the embodiment being described has been shown as being coupled to a chuck body 26, the chuck adjuster 46 could be used in combination with a cone assembly, such as the cone assembly shown and described in U.S. Pat. No. 5,493,939, which is assigned to the same assignee as the present invention and which is incorporated herein by reference and made a part hereof. The function and operation of chuck adjuster 46 and associated chuck 26 will now be described.

It should initially be appreciated that the chuck adjuster 46 enables the engraver 10 to adjust, change or move a position of chuck 26 and cylinder 24 and its associated axis of rotation, as well as alter the position of surface 36 relative to engraving device 34 (FIG. 1). This facilitates automatic mechanical adjustment of cylinder position, as well as reducing or eliminating undesired effects of certain cylinder characteristics, such as excessive cylinder run-out. In general, an adjustment signal associated or corresponding to run-out measured in accordance with features of this invention described later herein is generated by controller 17.

Processor 17 energizes motors 51 and 53 in response to the adjustment signal to adjust the axis of rotation of cylinder 24 by driving the outer eccentric sleeve 47 and inner eccentric sleeve 49. Thereafter, chuck adjuster 46 and associated chuck 26 are driven by fly wheel 44 (FIG. 1) which is coupled to drive motor 21 which is energized by controller 17. Note that drive motor 21 may comprise an encoder 21a associated with fly wheel 44 for determining the rotational position of, for example, containment sleeve 55.

Although not shown, the engraver 10 may further comprise a support or support means for supporting the cylinder 24 between headstock 14 and tailstock 16, for example, during loading and unloading.

It should be noted that the controller or processor, depicted diagrammatically as processor 17 in FIG. 1, is capable of electronically and automatically controlling the engraving operations, energization of the various drive motors (such as drive motors 20, 21, 22, 40, 51 and 53), as well as the operation of the first and second chucks 26 and 28 and chuck adjusters 46 and 48 of the present invention as described below.

Advantageously, this invention provides an improved engraving method and system which is capable of automatically determine a cylinder diameter as well as a cylinder run-out such that the engraver 10 can be adjusted to facilitate engraving controlled depth areas or cells of predetermined densities and to otherwise eliminate run-out problems associated with prior art engraving machines.

Referring now to FIGS. 2–6, engraver 10 further comprises a run-out detector or detection means 58 for detecting a cylinder characteristic of cylinder 24 after it has been rotatably mounted between headstock 14 and tailstock 16 on engraver 10. The run-out detector 58 comprises a sensor 60 for generating a signal corresponding to a characteristic of cylinder 24. In the embodiment being described, the sensor 60 comprises a linear variable displacement transducer (LVDT) probe 60a which cooperates with a target 61 to generate a displacement signal. The probe part No. AX2.5LBDT manufactured by Solartron Metrology of Buffalo, N.Y. has been found to be suitable for use in the embodiment being described.

The run-out detector 58 comprises a run-out circuit 62 (FIG. 6) comprising a signal conditioner 64 which is coupled to sensor 60 as shown. It has been found that Park Signal Conditioner No. OB5 manufactured by Schlumberger of Bogner Regis, West Sussex, P.O. 229ST, England is suitable for use in the embodiment being described.

As best illustrated in FIGS. 2 and 3, carriage 38 comprises a platform 66 of the type shown and described in U.S. Pat. No. 5,454,306, which is assigned to the same assignees as the present invention and which is incorporated herein by reference and made a part hereof.

Notice that the engraving head 32 is mounted on platform 66. Platform 66 comprises a deck 68 supported upon a base 70 by a front support column 72 and a rear support column 74. Preferably, the support columns 72 and 74 are secured fast to the deck 66 and base 70 at fixed points of attachment.

The support columns 72 and 74 are of matching construction and may be flexed to accommodate parallel motion of engraving head 32. In the unstressed or rest position, columns 72 and 74 extend perpendicularly between deck 68 and base 70 as shown in FIG. 2.

The base 70 is connected to a suitable driving mechanism, such as a leadscrew 76 (FIG. 2), to cause base 70 and deck 68 to be selectively driven in the direction indicated by the double arrow 78.

The leadscrew 76 is driven by a leadscrew drive means or drive motor 40 coupled to controller 17 which has an associated encoder 82 which is also coupled to controller 17 (FIG. 1).

A compression spring (not shown) or other biasing means may be provided to facilitate maintaining the guide shoe 35 in contact with surface 36 of cylinder 24 during normal operation. Thereafter, guide shoe 35 maintains contact with surface 36 of cylinder 24 by linear movement towards and away from the axis of cylinder 24.

It should be appreciated that processor 17 can energize drive motor 40 to cause deck 68 to be in a home position (illustrated in FIGS. 2 and 2A) where a rear end of deck 68 engages the reference position. Further, processor 17 may then energize drive motor 40 to drive leadscrew 76 such that engraving head 32 is driven toward cylinder 24 until guide shoe 35 engages surfaces 36 of cylinder 24 with a predetermined amount of pressure, such as five pounds in the embodiment being described.

As described later herein, drive motor 40 may drive leadscrew 76 such that the platform 66 is biased slightly toward the home reference position 84, as illustrated in FIG. 3 during the measurement process. The encoder 82 associated with drive motor 40 may be used to determine a distance, such as a distance illustrated by double arrow d in FIG. 3, that the platform 66 is driven. This facilitates obtaining accurate measurements of, for example, the position and diameter of cylinder 24 as well as cylinder run-out as described later herein.

Notice that the base 70 comprises a sensor support 86 which supports the sensor 60. In the embodiment being described and as mentioned earlier herein, the sensor 60 cooperates with the target 61 to generate a sensor signal which is directly proportional to the lateral displacement or oscillation of guide shoe 35 in response to the rotation of cylinder 24. Thus, as illustrated in FIGS. 4a–4d, after and guide shoe 35 has been driven into contact with surface 36, sensor 60 cooperates with target 61 to generate an analog sensor signal during the rotation of cylinder 24. The cylinder 24 may have a waveform shape representative of the surface 36 of the cylinder 24. For ease of illustration, four reference points P1, P2, P3 and P4 (FIG. 4a–4d) are indicated relative to surface 36 of cylinder 24 and a corresponding waveform 63 (FIG. 5) corresponding to the shape of surface 36 during one complete revolution of cylinder 24. For purposes of illustration, the cylinder 24 illustrated in FIGS. 4a–4d is shown as comprising a "high" lobe at P4 and a "low" lobe at P2. The high lobe generally corresponds to the largest radial distance between the rotational axis of cylinder 24 and surface 36, while the low lobe generally corresponds to the shortest radial distance. A waveform 65 (FIG. 5) for a concentrically-shaped cylinder (not shown) is shown for comparison purposes.

As illustrated relative to FIG. 6, the analog signal generated by sensor 60 is transmitted to the signal conditioner 64. The signal conditioner 64 generates a corresponding DC output voltage Vout, which is transmitted to a run-out circuit 62 and, specifically, to switches 88 and 90, reset control 92, a positive pole of comparator 94 and a negative pole of comparators 96.

The reset control 92 is under the control of processor 17 which initializes and/or resets the run-out circuit 62 by controlling one input of AND gates 106 and 108.

In general, run-out circuit 62 latches and holds a "high" and a "low" voltage for processing by processor 17. The high and low voltages correspond to the high and low lobes, respectively, mentioned earlier herein.

Notice that capacitor 98 and amplifier 100 are connected in series between switch 88 and positive pole comparator 94 to provide a buffer for storing the highest sensed voltage associated with the sensed signal. Likewise, capacitor 102 and amplifier 104 are connected in series between switch 90 and to a negative pole comparator 96 to provide a buffer for storing the lowest sensed voltage. In operation, when the highest voltage stored is less than the Vout, then an AND gate 106 causes switch 88 to close, thereby charging capacitor 98 to the Vout voltage. Conversely, when Vout is less than the voltage across capacitor 102, then an AND gate 108 causes switch 90 to close and charge capacitor 102 to the Vout voltage.

Amplifier 100 produces a Vhigh (FIG. 5) voltage in response thereto, and the Vhigh voltage is fed to a first differential driver 110. Likewise, Amplifier generates a low Vlow (FIG. 5) voltage which is fed to a second differential driver 112.

The first and second differential drivers 110 and 112 transmit the Vhigh and Vlow voltages to a first differential receiver 114, and a second differential receiver 116, respectively which, in turn, feed the high and low values to a multiplexer 118. An analog to digital converter 120 and processor 17 processes the voltages to determine a relative change or difference It has been found that this change or difference is directly proportional to the displacement of the sensor 60. For illustration, this displacement corresponds to the measured run-out which is depicted by double arrow RO in FIG. 5.

Once the run-out RO is known, this invention provides means for verifying the diameter and radius of the cylinder 24, as well as adjusting for the run-out in order to facilitate causing engraver 10 to engrave a predetermined pattern of engraved areas of desired densities. The method for determining cylinder radius and diameter will now be described relative to FIG. 11.

First, a look-up table of data (not shown) of a plurality of known cylinder dimensions is created and stored (block 122 in FIG. 11) in processor 17. In the embodiment being described, the look-up table comprises data associating the number of pulses measured by encoder 82 (FIG. 2) with a distance between platform 66 and reference position 84.

Thereafter, platform 66 is driven (block 124) until guide shoe 35 contacts surface 36 of cylinder 24. Processor 17 uses the look-up table to determine the distance d (FIG. 3).

Figure 14:
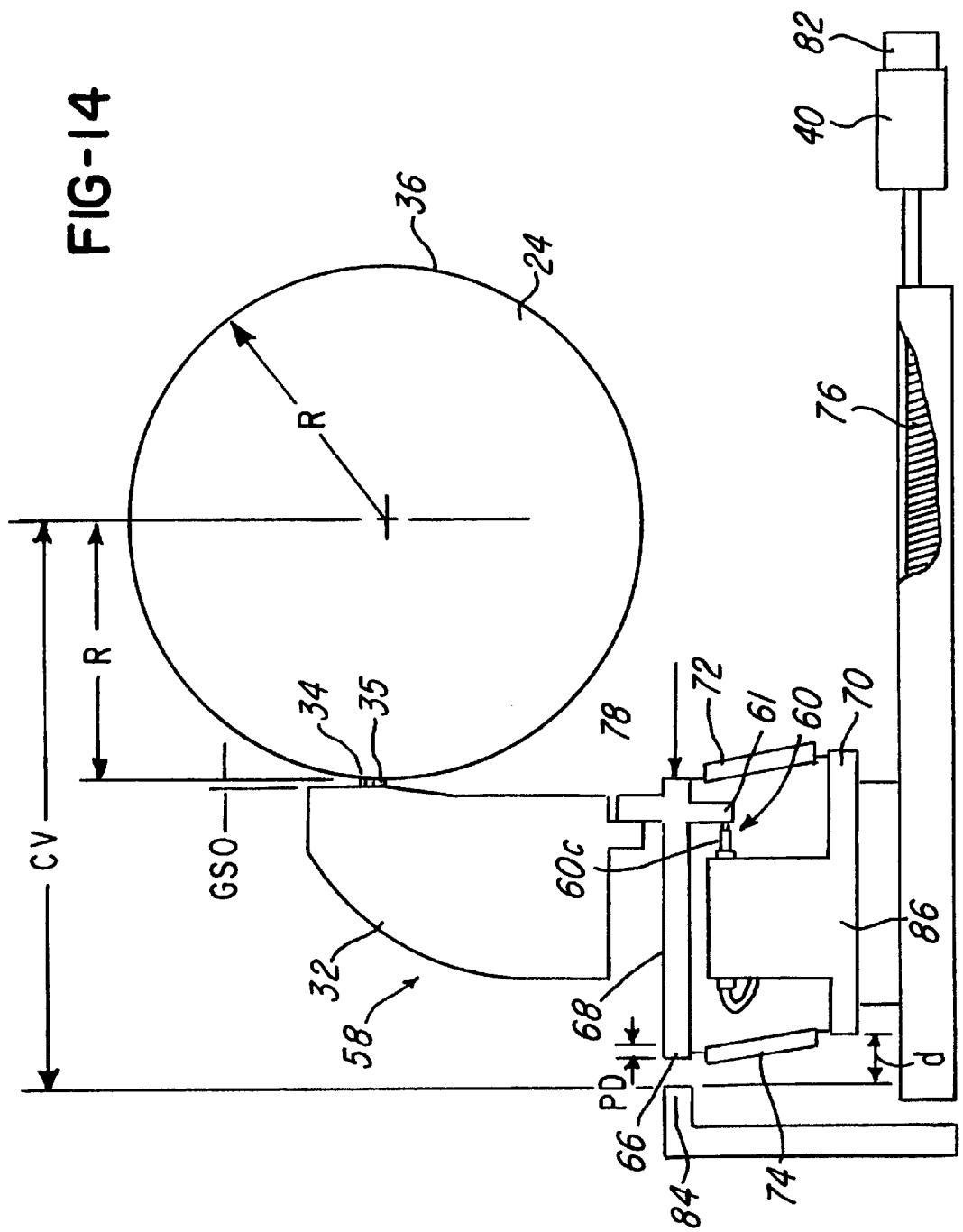
FIG. 14 is a fragmentary view illustrating a guide shoe displacement, a combination valve and a platform displacement.

A radius R (FIG. 14) of cylinder 24 may then be determined by applying the following equation 1:

$$R = CV - D + PD - GSO$$

where:

R equals a measured radius;

CV equals a calibration value which is found by measuring a radius of a calibration cylinder (not shown) having a known radius on engraver 10;

D is a distance corresponding to the number of encoder 82 pulses multiplied by a scaling factor and is represented by double arrow d in FIG. 14. In the embodiment being described, D may be represented by the following equation 2:

$$D = (K \times EP)$$

K is a constant scaler used to scale the pulses of encoder 82 to millimeters;

EP equals a number of encoder 82 pulses;

PD (FIG. 14) equals a displacement of platform 66 and is represented by the equation 3:

$$M((Vhigh-Vlow)/2)$$

GSO is a displacement of guide shoe 35 (FIG. 14) from reference position 84;

M is a constant scaler used to scale an average voltage to millimeters;

Vhigh is the Vhigh generated by amplifier 100 (FIG. 6); and

Vlow is the Vlow generated by amplifier 104.

Substituting equations 2 and 3 into equation 1 provides the overall formula:

$$R = CV - (K \times EP) + M((Vhigh-Vlow)/2) - GSO$$

Once the actual cylinder radius value R is determined, processor 17 may then determine a cylinder diameter may be determined, as well as whether the measurement is within a predetermined tolerance range (block 128 in FIG. 11). At blocks 130 and 132, the cylinder diameter CD may be displayed for verification by an operator, or alternatively, processor 17 may generate an alarm signal which is used to notify the operator that the cylinder diameter 60 is outside a desired cylinder diameter range, for example.

If the decision at block 128 is yes, then the measurement is displayed (block 134) and the cylinder measurement is complete.

This invention also provides means for measuring the cylinder characteristics, such as run-out and/or cylinder symmetry, adjusting the engraver 10 and subsequently engraving.

The method used to determine or measure the run-out (RO in FIG. 5) will now be described relative to FIG. 12 where the method begins by controller 17 causing guide shoe 35 to be driven against surface 36 of cylinder 24 (block 136). Controller 17 then energizes drive motor 21 (FIG. 1) to rotatably drive cylinder 24 (block 138). The run-out associated with cylinder 24 is measured (block 140) and displayed (block 142).

At decision block 142, it is determined whether the measured run-out is outside a predetermined tolerance, such as in excess of 50 microns. If it is not, then the adjustment procedure described later herein relative to FIG. 13 (block 146) is performed. Thereafter, or if the decision at decision block 142 is yes, then engraving may be performed (block 148). At block 150, cylinder 24 may the be removed from engraver 10 and placed in a printing press (not shown) in order to effect printing on a sheet or web (not shown) of material.

As mentioned above relative to block 146, this invention provides means for adjusting engraver 10 to account or accommodate an undesired cylinder 24 characteristic, such as excessive run-out. This adjustment procedure begins at block 152 (FIG. 13) where a counter is set equal to one. At decision block 154, it is determined if a manual adjustment procedure should be performed. In general, the manual adjustment procedure may be performed if the measured run-out is in excess of 600 microns. If the decision at decision block 154 is yes, then the manual adjustment is performed (block 156) by the operator by, for example, manually loosening, repositioning and retightening one or more of the jaws 26a or 28a associated with chucks 26 and 28. The jaws 26a or 28a may also be adjusted with the teachings of Serial No. 08/394,720 (mentioned earlier herein) if engraver 10 is equipped with a self-centering chuck of the type disclosed therein. Alternatively, one or more of the jaws 26a and/or 28a may be replaced with another jaw having a different size.

If the decision at block 154 is negative, then it is determined whether an automatic mechanical adjustment should be performed. Preferably, the automatic mechanical adjustment may be performed if the measured run-out is between 50 and 600 microns. If the decision at decision block 156 is yes, then controller 17 mechanically adjusts (block 158) an axial position of cylinder 24 by selectively energizing drive motors 51 and 53 (FIG. 7) to rotate outer and inner eccentric sleeves 47 and 49, respectively, in order to alter the axial position of chuck 26, for example.

If the decision at decision block 156 is negative, then it is determined whether an automatic engrave signal adjust should be performed (decision block 160). In general, the automatic engrave signal adjust may be performed when the measured run-out is less than 50 microns. Depending on the tolerance desired, it may desirable not to adjust for measured run-out if it is less than, for example, about 25 microns. At block 162, the engrave signal adjust is performed. In this regard, processor 17 may adjust one or more engraving drive signals which are used to energize engraving head 22 and stylus 34 in order to adjust for measured run-out when the engraver 10 engraves the predetermined pattern on surface 36 of cylinder 14. The teachings of U.S. Pat. Nos. 5,416,597, 5,424,845 and 5,438,422, all of which are assigned to the same assignee as the present invention and which are incorporated herein by reference and made a part hereof, may be utilized in this regard.

Thus, once the measured run-out is known, processor 17 can process an engraving drive signal by, for example, changing the amplitude and/or wavelength of either an AC drive signal or a DC drive signal in order to adjust the engraver 10 in response to the measured run-out. This facilitates engraving the predetermined engrave pattern comprising engraving areas or cells having desired densities.

If the decision at decision block 160 is negative, then the routine exits.

Note that one or more of the adjustments are performed at blocks 156, 158 and/or 162, the run-out associated with cylinder 24 may again be measured (block 168). At block 160, it can again be determined if the run-out is within a predetermined tolerance, such as plus or minus 200 microns in the embodiment being described. If it is, then the routine exits as shown. Otherwise, the counter is incremented by one (block 162). At decision block 164 it is determined if the count is equal to a predetermined maximum count which corresponds to the number of measurement iterations to be performed before a cylinder 24 is rejected. If the count is not equal to the maximum count, then the routine loops back as shown, otherwise an alarm signal is generated (at block 166) and the routine exits. The alarm signal may thereafter be used to halt the engraver 10 to cause an alarm to be displayed on a monitor (not shown).

Advantageously, this invention provides a method and apparatus for automatically measuring a characteristic of a cylinder, such as cylinder diameter, run-out, or cylinder concentricity/asymmetry so that the engraver 10 can be adjusted to account for such characteristics. It should be appreciated that these characteristics may be associated with cylinders that are not perfectly concentric or which have an associated run-out due to, for example, end shafts 24a and 24b not being coaxial with the axis of the cylinder or the end shafts 24a and 24b not being mounted properly in the chuck 26 and 28, respectively, such that the cylinder 24 rotates about its axis.

Further, this invention provides a method and apparatus for automatically measuring a characteristic of a cylinder, such as cylinder diameter, run-out, and cylinder concentricity so that the engraver 10 can be manually or automatically adjusted to account for such characteristics.

Various changes or modifications in the invention described may occur to those skilled in the art without departing from the true spirit or scope of the invention. The above description of the invention is intended to be illustrative only and not limiting, and it is not intended that the invention be restricted thereto, but that it be limited only by the true spirit and scope of the appended claims.

We claim:

1. An engraver for engraving a cylinder comprising:

an engraving bed;

an engraving head situated on said engraving bed;

a detector situated on the engraver for automatically detecting a cylinder run-out; and a processor coupled to said engraving head, driver and detector for controlling operation of said engraver;

said detector detecting said cylinder run-out and generating a detection signal in response thereto.

2. The engraver as recited in claim 1 wherein said detector comprises a LVDT sensor.

3. The engraver as recited in claim 1 wherein said processor adjusts said engraver if said cylinder run-out is greater than a predetermined run-out.

4. The engraver as recited in claim 3 wherein said predetermined run-out is more than about 25 microns.

5. The engraver as recited in claim 1 wherein said engraver comprises a controller for generating at least one engraving drive signal for energizing said engraving head and for receiving said detection signal;

said controller adjusting said at least one engraving drive signal in response to said detection signal.

6. The engraver as recited in claim 1 wherein said engraver further comprises:

a plurality of chucks for receiving said cylinder;

a chuck adjuster coupled to said controller for adjusting at least one of said plurality of chucks to change a position of said cylinder in response to said detection signal.

7. The engraver as recited in claim 6 wherein said detector is an LVDT sensor.

8. The engraver as recited in claim 6 wherein each of said plurality of chucks comprises a plurality of jaws, said chuck adjuster further comprising:

a jaw driver for adjusting at least one of said plurality of jaws to change said position of said cylinder.

9. The engraver as recited in claim 6 wherein each of said plurality of chucks comprises a plurality of jaws, said chuck adjuster further comprising:

a plurality of jaw drivers for adjusting said plurality of jaws to change said position of said cylinder.

10. The engraver as recited in claim 6 wherein said at least one chuck adjuster comprises at least one internal eccentric sleeve coupled to a body of said chuck.

11. The engraver as recited in claim 1 wherein said engraver further comprises:

an alarm for receiving said detection signal and for generating an alarm in response thereto.

12. A method for engraving a cylinder on an engraver comprising the steps of:

rotatably mounting a cylinder on the engraver; and automatically measuring run-out associated with said cylinder;

adjusting said engraver in response to said measurement; and engraving said cylinder.

13. The method as recited in claim 12 wherein said characteristic is total indicated run-out, said method further comprises the step of:

measuring said total indicated run-out.

14. The method as recited in claim 13 wherein said method further comprises the step of:

measuring said characteristic using a LVDT sensor.

15. The method as recited in claim 12 wherein said method further comprises the step of:

measuring said characteristic using a sensor.

16. The method as recited in claim 15 wherein said sensor is an LVDT sensor.

17. The method as recited in claim 12 wherein said adjusting step further comprises the step of:

adjusting at least one engraving drive signal in response to said characteristic.

18. The method as recited in claim 12 wherein said characteristic is run-out, said method further comprising the step of:

measuring said run-out;

adjusting at least one engraving drive signal in response to said measurement.

19. The method as recited in claim 18 wherein said at least one engraving drive signal is an AC signal.

20. The method as recited in claim 18 wherein said at least one engraving drive signal is a DC signal.

21. The method as recited in claim 19 wherein said at least one engraving drive signal further comprises a DC signal.

22. The method as recited in claim 12 wherein said method further comprises the step of:

adjusting a position of said cylinder on said engraver in response to said characteristic.

23. The method as recited in claim 12 wherein said method further comprises the step of:

adjusting at least one chuck on said engraver in order to change a position of said cylinder in response to said characteristic.

24. The method as recited in claim 23 wherein said method further comprises the step of:

changing a position of at least one jaw on said chuck.

25. The method as recited in claim 24 wherein said method further comprises the step of:

energizing a driver to drive an eccentric sleeve in said chuck.

26. The method as recited in claim 12 wherein said method further comprises the step of:

measuring a displacement of an engraving head on said engraver.

27. The method as recited in claim 12 wherein said characteristic comprises a cylinder radius, said method further comprising the step of:

measuring said radius of said cylinder.

28. The method as recited in claim 12 wherein said method further comprises the step of:

measuring concentricity of said cylinder.

* * * * *